April 17, 1962 M. H. HUMBERT 3,029,564
VALVE GRINDING MACHINES
Filed March 19, 1959 3 Sheets-Sheet 1

INVENTOR.
MARVIN H. HUMBERT
BY
Corey and Corey
Atty's

April 17, 1962　　　M. H. HUMBERT　　　3,029,564
VALVE GRINDING MACHINES

Filed March 19, 1959　　　　　　　3 Sheets-Sheet 2

INVENTOR.
MARVIN H. HUMBERT
BY Corey and Corey
Atty's

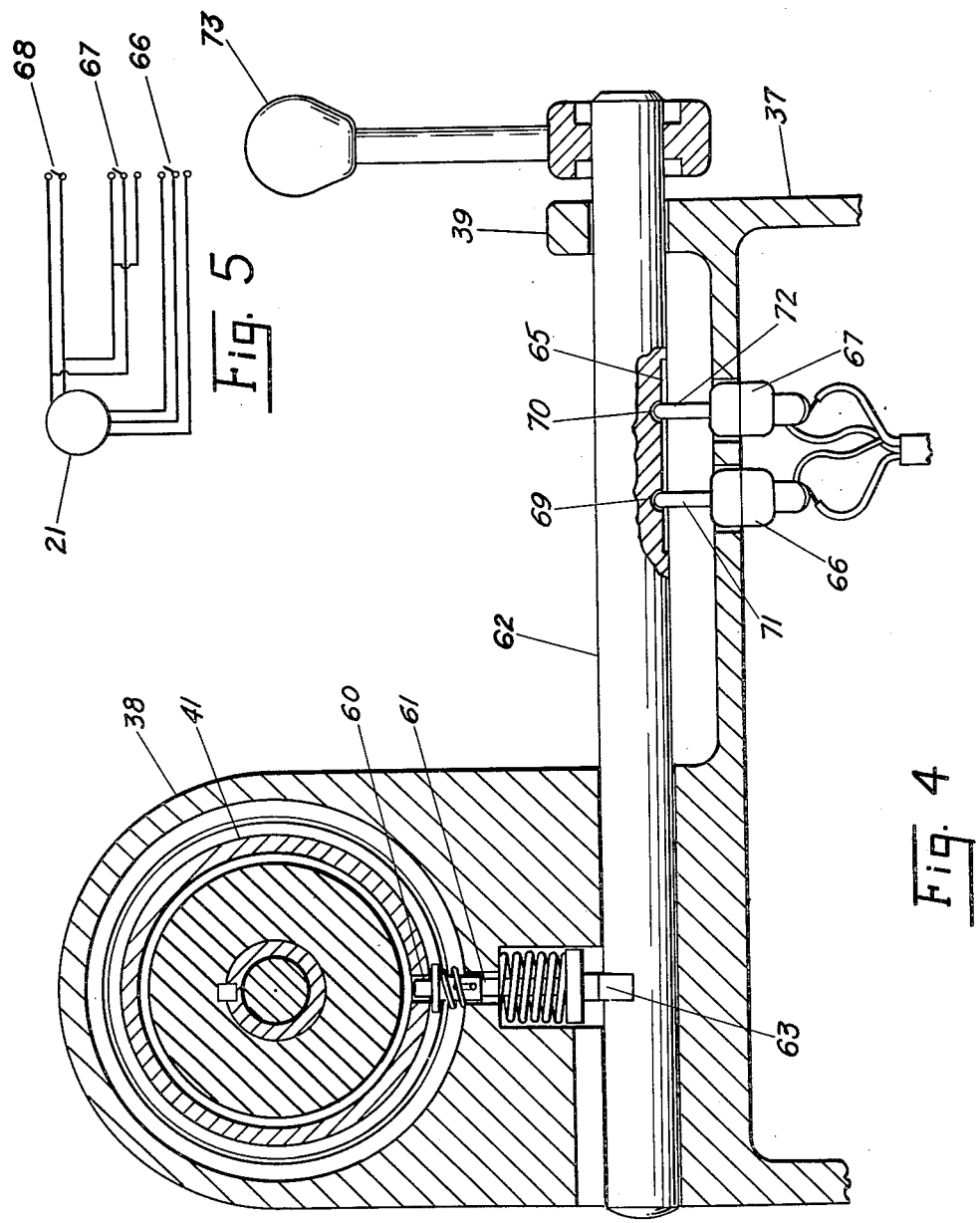

United States Patent Office 3,029,564
Patented Apr. 17, 1962

3,029,564
VALVE GRINDING MACHINES
Marvin H. Humbert, 3015 30th St. Drive SE.,
Cedar Rapids, Iowa
Filed Mar. 19, 1959, Ser. No. 800,482
2 Claims. (Cl. 51—105)

This invention concerns a valve grinding machine and more particularly one in which the chuck may be opened and closed electrically by the movement of a single control.

In valve grinding machines such as are used in garages and the like where repair work is done, it has been the practice to use a standard manual chuck to hold the valve stem. Adjusting this chuck for each valve takes time and also requires the valve grinder to be stopped.

It is therefore a primary object of my invention to provide a device in which the valve stem may be automatically positioned concentric with the axis of the chuck spindle by reason of simultaneous, opposed, longitudinal movement of the chuck jaws applying pressure at both ends of the valve stem.

It is a further object of my invention to provide a valve grinding machine in which the motor which turns the spindle may also be utilized to open and close the chuck.

It is yet another object of my invention to provide a device in which stopping the chuck sleeve will cause opposed chuck jaws to move outwardly or inwardly, depending upon the direction of rotation of the spindle.

It is yet another object of my invention to provide a device in which the direction of rotation of the chuck can be reversed by movement of a single control.

It is a still further object of my invention to provide a device in which the alignment of every valve positioned therein will be identical.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 4 is an end view of the chuck and base in cross section taken at a center line of the base member.

FIGURE 5 is a schematic diagram of the electrical connections, and

Figure 1:
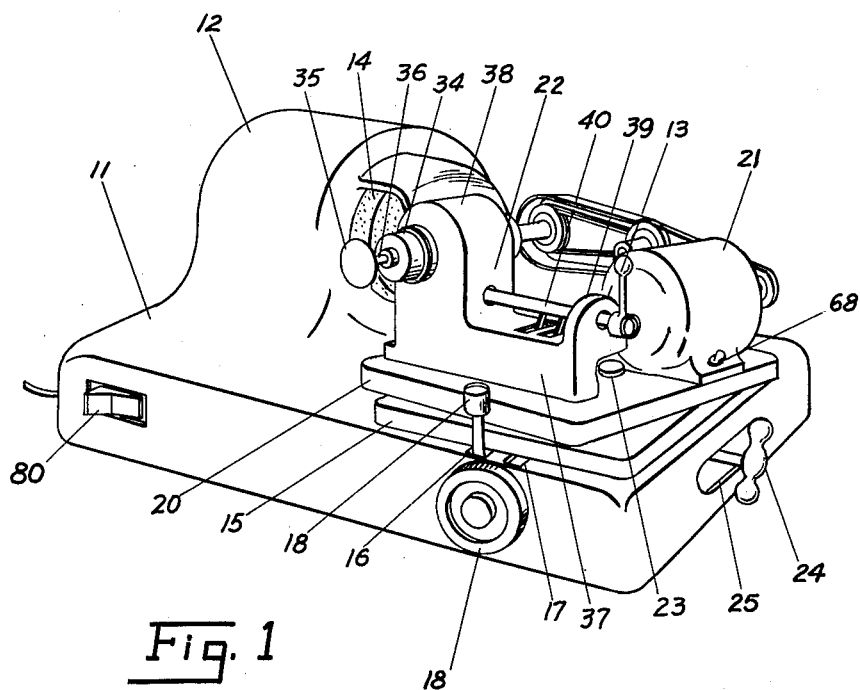
FIGURE 1 is a view in perspective showing a valve grinding machine including the chuck, said machine being constructed according to my invention.
Figure 6:
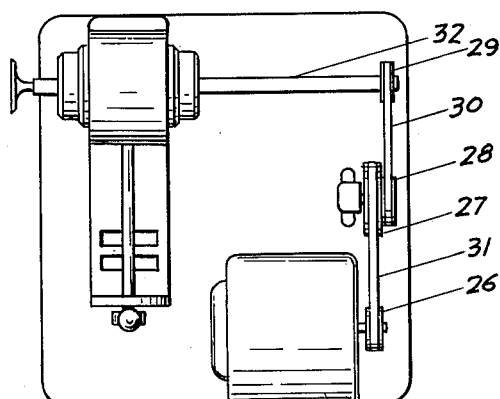
FIGURE 6 is a top view of the device to show the relative position of the components thereof.

Referring now to the drawings:

A valve grinding machine constructed according to my invention comprises three basic assemblies—the base member 11 on which is mounted a grinding wheel 14, a motor 12, and a valve positioning assembly, indicated generally at 13, which also rotates the valve. This valve positioning assembly may be moved back and forth parallel to the face of the grinding wheel 14 and also rotated on its own axis to vary the angle of the valve in relation to the grinding wheel in a manner hereinafter set forth.

The valve holding assembly includes a slidable base member 15 which is mounted to move parallel to the face of the grinding wheel in slots or ways 16 and 17. Movement is secured by the rotation of the adjusting wheel 18.

The assembly also includes a second base member 20 on which a motor 21 and a chuck housing 22 are mounted. This base member 20 is adapted to rotate about its own axis on a pin 23 which is geared to a handle member 24 which may be turned to rotate the base. It will be noted that this handle member may move back and forth in the slot 25 in the base member 11 to permit the member 15 to move in the ways 16 and 17.

It is this valve holding assembly with which my invention is primarily concerned. The motor 21, through a series of intermediate pulleys 26, 27, 28 and 29 which are interconnected by two belts 30 and 31, drives the hollow spindle shaft 32.

A chuck mechanism, indicated generally at 34, is mounted on this shaft or spindle and it is this chuck which holds the valve 35 by its stem 36.

The chuck 34 is mounted in a housing 22. This housing comprises a base portion 37 which is of substantial length and is positioned on the base or plate 20. This base 37 is formed with a large semi-circular boss 38 on one end in which the chuck is positioned, and an upwardly extending ear 39 on the other end which holds a control shaft 40.

Figure 2:
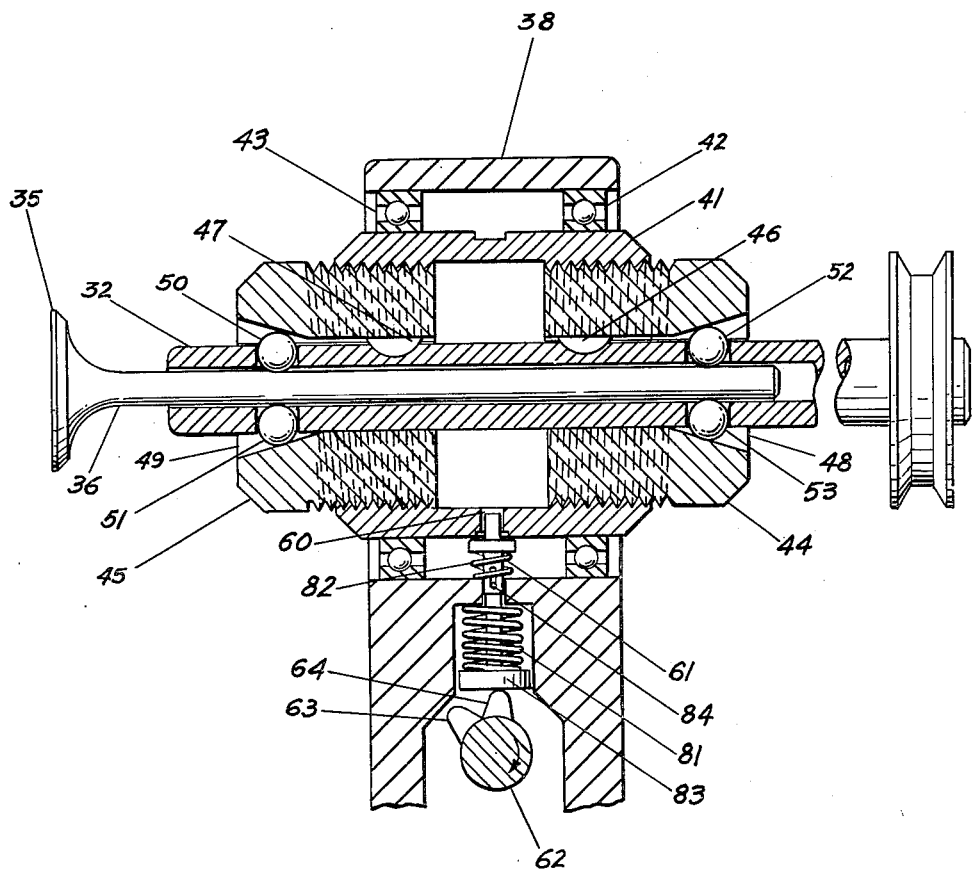
FIGURE 2 is a side view in cross section of the chuck mechanism of the device shown in FIGURE 1.

Referring now to the drawings, and more particularly to FIGURE 2; as previously set forth, the chuck is driven by the tubular shaft 32. The chuck includes a sleeve member 41 which forms the outer shell of the chuck member and is mounted in the boss 38 on two bearings 42 and 43 to permit its free rotation. Threaded in the ends of this sleeve are two opposed jaw members 44 and 45. These jaw members are threaded in opposite directions, as indicated by the dotted lines of FIGURE 2, and are keyed to the hollow shaft or spindle 32 by keys 46 and 47. The stem of the valve is positioned longitudinally inside of the hollow spindle 32. The jaw members 44 and 45 are tapered inwardly at 48 and 49 to permit the application of the wedge force on the spindle of the valve through a plurality of steel balls 50, 51, 52 and 53. Openings are provided through the spindle to permit these balls to contact the stem of the valve as the jaw members 44 and 45 are moved longitudinally of the chuck and the valve stem.

It will be apparent, from the foregoing description, that as the spindle 32 is rotated, the jaw members 44 and 45 will also be rotated and will carry with them the sleeve 41. When a valve is positioned in the spindle, a frictional engagement will be set up between the valve stems through the balls such as 50, 51, 52 and 53, thence through the jaw members and to the sleeve 41.

It will also be apparent that if the rotation of the sleeve 41 is halted while the spindle 32 is still turning, the jaw members 44 and 45 will continue to rotate, and since they are threaded to the sleeve and the direction of the threading is opposite from one jaw member to another, the jaws will move longitudinally in relation to the spindle 32, either increasing or decreasing the wedge action on the valve spindle, and in this manner the valve will be either firmly held or freely released from the chuck, depending on the direction of rotation of the spindle 32.

I will now describe the operative mechanism by which the rotation of this sleeve member can be halted at the will of the operator of the machine. The structure by which this connection is secured is more particularly set forth in FIGURE 4. The sleeve 41 has an opening 60 in its periphery and located centrally of the jaw members 44 and 45. This opening is adapted to receive a double spring-loaded plunger member 61 which is moved into and out of engagement therewith by means of the rotation of the control shaft 62.

The movement of the plunger unit 61 is secured by rotating the shaft 62 which has two cam members 63 and 64. These cam members are positioned to engage the base 83 of the plunger. A spring 81 normally holds the plunger downwardly and open. A second spring 82 is adapted to urge the plunger upwardly, its upward movement being limited by a pin and slot assembly 84. The second spring permits the plunger assembly to telescope on itself until the spring 60 moves into registry with the plunger, at which point the upper end of the plunger will be forced into the opening by the spring 82.

The control shaft has two radially positioned bosses 63 and 64 which, as they are rotated about the axis of the shaft, engage the plunger 61 and move it upwardly into the opening 60. This shaft also is provided with a switch actuating surface 65. It will be noted that the shaft 62 is positioned with one end in the boss member 38 and the other end extended through the ear portion 39 on the base 37. The aforementioned switch control surface is positioned midway between these two points.

Figure 3:
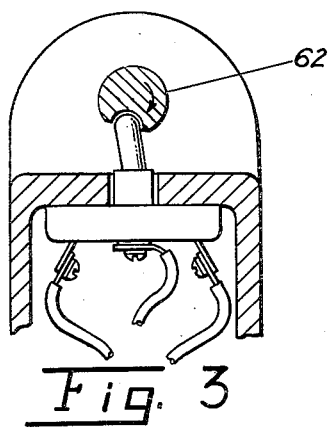
FIGURE 3 is a view in cross section of the base member of the valve grinder, showing the relative position of the chuck control shaft and the electric switch actuated thereby.

Below this control surface and mounted in the base 37 are two switches 66 and 67. The motor 21 is a standard reversible electric motor of the type commonly supplied by motor manufacturers. The switch 67 is provided to start and stop the motor and the switch 66 is provided to reverse the motor's direction of rotation. The switch 68 is mounted on the motor 21 and is provided to start and stop the motor independently of switch 67. Referring to FIGURES 2 and 3, it will be noted that when the control shaft 62 is in such position that neither the boss 63 nor the boss 64 are urging the plunger in an upwardly direction, the toggles of switches 66 and 67 will be in a neutral position and inoperative to control the motor. It will be understood that when the plunger is withdrawn the chuck assembly is free to rotate, and it is in this condition that the grinding operation is customarily carried out, the control of the motor being achieved by the movement of the independently mounted switch 68.

To secure the movement of the switches 66 and 67, I have provided two indentations 69 and 70 in the switch control surface 65. These indentations engage the toggles 71 and 72 of the two switches. As the control shaft 62 is rotated, the toggle members 71 and 72 are thrown to the left or to the right as desired by the operator. When they are thrown to the right, the switch 67 will engage one pole and energize the motor. At the same time, the switch 66 will also be thrown to the right and will engage one pole to cause the motor to turn in one direction. By reversing the control shaft to the left, the motor will again be energized by switch 67 and its direction of rotation reversed by the engagement of switch 66 with its opposite pole.

It will be at once apparent that as the shaft and its associated handle 73 are turned to the left or the right, the jaws 44 and 45 of the chuck member will be threaded inwardly or outwardly, depending upon the direction of rotation of the motor, to engage or to release the valve stem.

From the foregoing description it will be obvious that the operator of a valve grinding machine, constructed according to my invention, can quickly and readily chuck one valve after another into the device and will be assured that the valves will be uniformly positioned. This uniformity is achieved by the fact that there are two opposed chuck jaws which grip the valve stem at two points some distance apart.

It will be further apparent that the motor 21, which powers the chuck drive, may be operated either to open and close the chuck or to rotate the spindle for the grinding operation. It will be further apparent that these two operations can be performed independently, one of the other. It will also be noted that the grinding wheel motor 12 is operated independently of any of the components of the valve holding assembly inasmuch as its electrical connection is achieved by the operation of a main switch 80 which is positioned in the base member 11.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a valve grinding machine of the type described, a base member having a motor driven grinding wheel mounted thereon, a chuck housing slidably mounted on said base member adjacent said grinding wheel, a sleeve mounted in said housing, said sleeve being internally threaded at both ends thereof, said threads being opposite in direction, a second pair of sleeves mounted internally of said first sleeve in threaded engagement therewith, a tubular spindle mounted internally of said second pair of sleeves, said second pair of sleeves being keyed to said tubular spindle and adapted to move longitudinally in relation to said spindle, the outermost portion of each of said second pair of sleeves having an internal angular face means, gripping means mounted in said tubular spindle adjacent said angular face means, a second motor mounted adjacent said chuck housing and operatively connected to said spindle, stop means positioned in said chuck housing to engage said first named sleeve to stop the rotation thereof at will, a control shaft rotatably mounted in said chuck housing and adapted to actuate said stop means and switching means mounted in said chuck housing adjacent said shaft, means on said control shaft adapted to actuate said switching means as said shaft is rotated, said switching means being provided to control said second motor whereby by the rotation of said control shaft the first sleeve may be stopped to cause said second pair of sleeves to move longitudinally internally of said first sleeve to alternately engage and disengage said gripping means in relation to a valve, while simultaneously controlling said second motor.

2. In a valve grinding machine having a base member, a motor driven grinding wheel mounted on said base member, a second base member mounted on the first base member and adapted to be selectively positioned thereon in relation to said grinding wheel, a chuck housing mounted on said second base member, a sleeve rotatably mounted in said chuck housing, said sleeve being internally threaded, a pair of chuck members threaded into said sleeve, a rotatable spindle positioned internally of said chuck members, said chuck members being longitudinally slidable thereon, key portions between said chuck members on said spindle to prevent relative rotation of said chuck members on said spindle, openings through said spindle member, said openings having balls therein adapted to be biased against said chuck member, the outer ends of said chuck members being chamfered to force said balls inwardly, the spindle being adapted to receive a valve stem internally thereof, a motor mounted on said second base member and adapted to rotate said spindle either clockwise or counter-clockwise, stop means in said chuck housing adapted to selectively engage said sleeve and to stop the rotation thereof, lever means positioned in said second base member adapted to selectively move said stop means, the threaded portions of said chuck members being so threaded as to permit the selective movement of said chuck members outwardly or inwardly to cause the aforesaid balls to engage or disengage the valve stem, switch means mounted on said second base member adjacent said lever means, and indentations in said lever means adapted to actuate said switch means as said lever means is moved, said switch means being operatively connected to the motor to cause said motor to start or stop or reverse its direction of rotation.

References Cited in the file of this patent

UNITED STATES PATENTS

| | | |
|---|---|---|
| 1,510,812 | Weinert et al. | Oct. 7, 1924 |
| 1,582,010 | Hanson | Apr. 20, 1926 |
| 1,800,291 | Graves | Apr. 14, 1931 |
| 1,825,219 | Weber | Sept. 29, 1931 |
| 2,092,117 | Hall | Sept. 7, 1937 |